United States Patent
Salonidis et al.

(10) Patent No.: US 9,060,285 B2
(45) Date of Patent: Jun. 16, 2015

(54) DEVICE AND METHOD FOR ONLINE COMPUTATION OF THE FEASIBLE RATES REGION OF A RANDOM ACCESS NETWORK

(75) Inventors: Theodoros Salonidis, Paris (FR); Georgios Sotiropoulos, Athens (GR); Ramesh Govindan, Los Angeles, CA (US); Roch Guerin, Newtown Square, PA (US)

(73) Assignee: Thomson Licensing, Issy-les-Moulineaux (FR)

( * ) Notice: Subject to any disclaimer, the term of this patent is extended or adjusted under 35 U.S.C. 154(b) by 458 days.

(21) Appl. No.: 13/138,778

(22) PCT Filed: Mar. 18, 2010

(86) PCT No.: PCT/EP2010/053577
§ 371 (c)(1),
(2), (4) Date: Jan. 17, 2012

(87) PCT Pub. No.: WO2010/112349
PCT Pub. Date: Oct. 7, 2010

(65) Prior Publication Data
US 2012/0106337 A1 May 3, 2012

(30) Foreign Application Priority Data
Apr. 3, 2009 (EP) ..................................... 09305284

(51) Int. Cl.
*H04W 24/02* (2009.01)
(52) U.S. Cl.
CPC ...................... *H04W 24/02* (2013.01)
(58) Field of Classification Search
CPC .................................................... H04W 24/02

USPC .............. 370/229, 230, 230.1, 231, 232, 233, 370/235, 238
See application file for complete search history.

(56) References Cited

U.S. PATENT DOCUMENTS

| 6,584,111 | B1 * | 6/2003 | Aweya et al. .................. 370/412 |
| 7,639,637 | B2 | 12/2009 | Honjo et al. |
| 7,899,015 | B2 * | 3/2011 | Bottomley et al. ........... 370/335 |
| 7,920,991 | B2 * | 4/2011 | Kodialam et al. ................. 703/2 |

(Continued)

FOREIGN PATENT DOCUMENTS

| CN | 1864370 | 11/2006 |
| CN | 1886948 | 12/2006 |

(Continued)

OTHER PUBLICATIONS

Ahmed et al., "Online Estimation of RF Interference", ACM Conext 2008, Madrid Spain, Dec. 10, 2008.

(Continued)

Primary Examiner — Raj Jain
(74) Attorney, Agent, or Firm — Myers Wolin LLC

(57) ABSTRACT

A method is intended for computing online a feasible rates region in a network using a random access MAC protocol and comprising nodes having links there between. This method comprises the steps of i) determining, for each link, a primary extreme point corresponding to a maximum output rate when this link transmits alone at a maximum input rate, and ii) determining secondary extreme points by combining these primary extreme points with a chosen interference model, these primary and secondary extreme points defining a boundary of a feasible rates region.

16 Claims, 1 Drawing Sheet

(56) References Cited

U.S. PATENT DOCUMENTS

| | | | |
|---|---|---|---|
| 2005/0075104 | A1 | 4/2005 | Jain et al. |
| 2006/0256723 | A1* | 11/2006 | Hellenthal .................. 370/235 |
| 2007/0025364 | A1* | 2/2007 | Kodialam et al. ............. 370/400 |
| 2008/0212539 | A1 | 9/2008 | Bottomley et al. |

FOREIGN PATENT DOCUMENTS

| | | |
|---|---|---|
| EP | 1665683 | 8/2009 |
| EP | 1687940 | 1/2013 |
| JP | 2007110373 | 4/2007 |

OTHER PUBLICATIONS

Niculescu, "Interference Map for 802.11 Networks", ICM'07, San Diego, CA, Oct. 24, 2007, pp. 339-350.

Search Report Dated Jun. 23, 2010.

Garetto et al., "Modeling media access in embedded two-flow topologies of multi-hop wireless networks", MOBICOM '05 Proc. Of the 11th Annual Int Conf. on Mobile computing and networking, Cologne, Germany, Aug. 28-Sep. 02, 2005, pp. 200-214.

http://read.cs.ucla.edu/click/, "The Click Modular Router Project", Nov. 23, 2009.

Hegde et al., "Packet and Flow Level Performance of Wireless Multihop Data Networks", Global Telecommunications Conference 2006 GLOBECOM '06. IEEE, Nov. 27-Dec. 1, 2006, San Francisco, CA, USA, pp. 1-5.

Aguayo et al, "Link-level Measurements from an 802.11b Mesh Network", SIGCOMM'04, Portland, Oregon, USA, Aug. 30-Sep. 3, 2004.

Bianchi, "Performance analysis of the IEEE 802.11 distributed coordination function", IEEE Journal on Selected Areas in Communications, vol. 18 Issue 3, Mar. 2000, pp. 535-547.

Bonald et al., "Flow-level Stability of Utility-Based Allocaions for Non-Convex Rate Regions", Conference on Information Sciences and Systems-CISS 2006, Mar. 22-24, 2006, pp. 327-332.

Boorstyn et al., "Throughput Analysis in Multihop CSMA Packet Radio Networks", IEEE Transactions on Communications (vol. 35, Issue 3), Mar. 1987, pp. 267-274.

Chebrolu et al., "Long-distance 802.11b links: performance measurements and experience", MobiCom '06 Proceedings of the 12th annual international conference on Mobile computing and networking, Los Angeles, California, USA Sep. 23-26, 2006.

Chen et al, "Ad hoc probe: path capacity probing in wireless ad hoc networks", First International Conference on Wireless Internet (WICON'05) 10-14-10-15 Jul. 2005.

Draves et al., "Routing in multi-radio, multi-hop wireless mesh networks", MobiCom '04 Proceedings of the 10th annual international conference on Mobile computing and networking, Philadelphia, Pennsylvania, USA, Sep. 26-Oct. 1, 2004.

Kashyap et al., "A measurernent-based approach to modeling link capacity in 802.11-based wireless networks", Proceedings of the 13th annual ACM international conference on Mobile computing and networking MOBICOM '07, Montreal, Quebec, Canada, Sep. 9-14, 2007.

Li et al., "Predictable performance optimization for wireless networks", SIGCOMM '08 Proceedings of the ACM SIGCOMM 2008 conference on Data communicationJ, Seattle, Washington, USA, Aug. 17-22, 2008, Seattle, Washington, USA.

Makino et al., "New algorithms for enumerating all maximal cliques", 9th Scandinavian Workshop on Algorithm Theory, Humlebaek, Denmark, Jul. 8-10, 2004.

Paohye et al., "Estimation of link interference in static multi-hop wireless networks", IMC '05 Proceedings of the 5th ACM SIGCOMM conference on Internet Measurement, USENIX Assoc., Berkeley, CA, USA, Oct. 2005.

Qiu et al., "A general model of wireless interference", MobiCom '07 Proceedings of the 13th annual ACM international conference on Mobile computing and networking, Montreal, Quebec, Canada, Sep. 9-14, 2007.

Raman et al., "Design and evaluation of a new MAC protocol for long-distance 802.11 mesh networks", MobiCom '05 Proceedings of the 11th annual international conference on Mobile computing and networking, Cologne, Germany, Aug. 28-Sep. 2, 2005.

Rangwala et al., "Understanding Congestion Control in Muiti-hop Wireless Mesh Networks", Proceedings of the 14th Annual International Conference on Mobile Computing and Networking, MOBICOM 2008, San Francisco, California, USA, Sep. 14-19, 2008.

Rayanchu et al., "Diagnosing Wireless Packet Losses in 802.11: Separating Collision from Weak Signal", INFOCOM 2008, 27th Conference on Computer Communications, IEEE, Apr. 13-18, 2008.

Reis et al., "Measurement-based models of delivery and interference in static wireless networks", SlGCOMM 2006-ACM SIGCOMM Conference, Pisa, Italy, Sep. 11-15, 2006.

Sharma et al., "FreeMAC: Framework for Multi-Channel MAC Development on 802.11 Hardware", PRESTO '08 Proceedings of the ACM workshop on Programmable routers for extensible services of tomorrow, Seattle, Washington, USA Aug. 17-22, 2008.

Shi et al., "Measurement and Modeling of the Origins of Starvation in Congestion Controlled Mesh Networks", INFOCOM 2008, The 27th Conference on Computer Communications, IEEE, Apr. 13-18, 2008.

Whitehouse et al., "Exploiting the Capture Effect for Collision Detection and Recovery", Proceeding EmNets '05 Proceedings of the 2nd IEEE workshop on Embedded Networked Sensors, Apr. 30, 2005.

Xu et al., "Enhancing TCP fairness in ad hoc wireless networks using neighborhood RED", MobiCom '03 Proceedings of the 9th annual international conference on Mobiie computing and networking, San Diego, California, USA, Sep. 14-19, 2003.

Jindal et al., "Achievable rate region and optimality of muiti-hop wireless 802.11-scheduled networks", Information Theory and Applications Workshop, 2008, San Diego, CA- IEEE, Jan. 27-Feb. 1, 2008.

* cited by examiner

DEVICE AND METHOD FOR ONLINE COMPUTATION OF THE FEASIBLE RATES REGION OF A RANDOM ACCESS NETWORK

This application claims the benefit, under 35 U.S.C. §365 of International Application PCT/EP2010/053577, filed Mar. 18, 2010, which was published in accordance with PCT Article 21(2) on Oct. 7, 2010 in English and which claims the benefit of European patent application No. 09305284.3, filed Apr. 3, 2009.

TECHNICAL FIELD

The present invention relates to random access networks, and more precisely to computation of feasible rates regions of such networks.

One means here by "random access network" a network in which nodes operate based on a random access (or "contention-based") MAC ("Medium Access Control") protocol, such as ALOHA or CSMA ("Carrier Sense Multiple Access"), for instance. So it could be a fixed (communication) network or a wireless (communication) network, and notably an IEEE 802.11 network (i.e. a WLAN (Wireless Local Area Network), for instance of the WiFi type).

BACKGROUND OF THE INVENTION

In the following description, it will be considered that:
the "output rate" of a link is equivalent to the "throughput" of this link,
the "maximum output rate" of a link is equivalent to the "maximum throughput" or to the "capacity" of this link,
"transmit in backlogged mode" is equivalent to "transmit at a maximum input rate".

As it is known by the man skilled in the art, some of the above mentioned networks, deployed in urban and rural areas around the globe, and notably 802.11 multi-hop wireless mesh networks, enable low cost Internet access and emerging community applications.

Random access networks offer advantages such as simple decentralized Medium Access Control (MAC) protocols that arbitrate transmissions to the wireless medium. However, they are also limited by well-known performance problems such as lack of predictability, unfairness or even complete starvation. These problems are due to the poor synergy of the random access MAC protocol (and notably the IEEE 802.11 one) and higher layers of the protocol stack. Several solutions have been proposed but most require modifications of the MAC protocol or higher layer legacy protocols like TCP.

These solutions may be classified into three categories: throughput prediction solutions, capacity estimation solutions and protocol solutions. One focuses hereafter on the IEEE 802.11 solutions, but as mentioned above the invention is not limited to this type of network.

Several models have been proposed for throughput prediction in 802.11 random access multi-hop networks. Most of them are based on a first solution described in the document of G. Bianchi, "Performance analysis of the IEEE 802.11 distributed coordination function", IEEE Journal on Selected Areas in Communications, 18(3):535-547, March 2000, which captures the effect of IEEE 802.11 binary exponential backoff in single-hop networks, and on a second solution described in the document of R. Boorstyn et al., "Throughput Analysis in Multi-hop CSMA Packet Radio Networks", IEEE Transactions on Communications, 35(3):267-274, March 1987, which captures the effect of carrier sensing in multi-hop networks.

These models vary in the accuracy with which they model interference (either based purely on geometry or seeded with actual measurements), and their prediction power (single-hop throughput prediction or multi-hop throughput prediction). These models are impractical for operational multi-hop 802.11 networks for two reasons. First, many of these models do not provide closed form expressions for throughput, and therefore one must exhaustively search through the feasible rates region they defined to predict an optimal multi-hop throughput. This search can become prohibitively expensive as the number of flows increases, except if feasibility is characterized by means of non-linear constraints at the potential cost of reduced accuracy. Second, all existing measurement-based models require a separate measurement phase where all links are activated backlogged in specific patterns (individual node activations or pair-wise link activations). As a result, they require either $O(N^2)$ measurements or $O(L^2)$ measurements, and each measurement typically requires several seconds to collect sufficient statistics. In practice, this imposes an extended mesh network downtime and complicates the network operations with additional signalling mechanisms to switch between measurement and regular operation.

It has been recently proposed, in the document of N. Ahmed et al., "Online Estimation of RF Interference", Proc. ACM CoNEXT, Madrid, Spain, December 2008, a new technique allowing to significantly reduce the time of these measurements in client-AP WLANs, but this new technique is not applicable to multi-hop wireless mesh networks and requires extensive firmware modifications.

SUMMARY OF THE INVENTION

The objective of this invention is to offer a method and an associated device allowing determination (or computation) of feasible rates regions in random access networks (i.e. using a random access MAC protocol), and possibly an optimization of the performance of these random access networks, through rate control. This method does not require modifications of legacy protocols and can be readily implemented (or incorporated) in today's deployments using traffic shapers and rate limiters that are widely available.

More precisely, the invention provides a method, intended for computing online a feasible rates region in a network using a random access MAC protocol and comprising nodes having links therebetween. The online computation of the feasible rates region enables applications like admission control or network optimization.

One means here by "feasible rates region" the set of rates that can be simultaneously sustained by the random access network at a given time. A more formal definition of a feasible rates region is: the set of all achievable output rates (or throughputs) that result from input rates that are scaled down only by the inherent link packet loss rates ($p_l$). The inherent packet loss rates are measured or estimated when the links transmit alone in backlogged mode (i.e. at a maximum input rate). In the special case where the inherent packet loss rates $p_l$ are zero, the feasible rates region is the set of all output rates (or throughputs) that are equal to their corresponding input rates.

This method comprises the steps of:
i) determining, for each link, a primary extreme point corresponding to a maximum output rate (or maximum throughput or else capacity) when this link transmits alone at a maximum input rate (i.e. in a backlogged mode), and
ii) determining secondary extreme points by combining these primary extreme points with a chosen interference model, these primary and secondary extreme points defining a boundary of a feasible rates region.

The method according to the invention may include additional characteristics considered separately or combined, and notably:

- in step i) one may determine the primary extreme points online;
- in step i) each primary extreme point of a link may correspond to a maximum output rate achieved when this link transmits alone at a maximum input rate (or in a backlogged mode);
  - to compute the maximum output rate (or capacity) one may first measure online the packet loss rate experienced by the Medium Access Control (MAC) protocol by means of network-layer broadcast probes, then one may use a channel loss rate estimator to filter out collisions induced by cross-traffic into the measured packet loss rate in order to produce a channel loss rate, then one may use a capacity representation that relates the maximum output rate to the channel loss rate;
  - the maximum output rate may be a maximum User Datagram Protocol (UDP) output rate;
- in step ii) one may determine the secondary extreme points by combining the primary extreme points with the chosen interference model assuming a) pair-wise interferences, where each interference between two links of a pair is viewed as independent from interferences between other pairs of links, and b) binary interferences, where two links of a pair either interfere in a mutually exclusive manner or do not interfere;
- in step ii) one may build a conflict graph of the network in which each vertex corresponds to a unidirectional link and each edge between a pair of vertices corresponds to an interference between the pair of unidirectional links which correspond to this pair of vertices, and one may determine said secondary extreme points from maximal independent sets of vertices of the conflict graph;
  - one may determine each maximal independent set of vertices by means of either an independent set enumeration algorithm on the conflict graph or a maximal clique enumeration algorithm on a complement of the conflict graph;
  - the chosen interference model may be a binary LIR (Link Interference Ratio) interference model.

The invention also provides a device, intended for computing online a feasible rates region in a network using a random access MAC protocol and comprising nodes having links therebetween, and comprising:

- a first computation means arranged for determining, for each link, a primary extreme point corresponding to a maximum output rate (or capacity) when this link transmits alone at a maximum input rate, and
- a second computation means arranged for determining secondary extreme points by combining these primary extreme points with a chosen interference model,
- these primary and secondary extreme points defining a boundary of a feasible rates region.

This device may further comprise a third computation means arranged for computing a set of target output rates for the network from channel loss rates provided by the nodes, neighbourhood relationships between nodes, a routing matrix and the primary and secondary extreme points.

This third computation means may be arranged for computing the set of network target output rates by optimizing a utility function of the target output rates subject to constraints based on the routing matrix and the primary and secondary extreme points, then by selecting a subset of output rates, for which an associated node is a source, from this computed set, and for generating optimized input rates corresponding to these output rates of the selected subset.

This device may also further comprise a control means arranged for limiting the rate of the flows of the associated node according to the generated optimized input rates.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims at offering a method, and an associated device (D), intended for computing online a feasible rates region in a random access network (WN) (i.e. a network using a random access MAC protocol).

In the following description it will be considered that the network (WN) is of the wireless type, and more precisely that it is an IEEE 802.11 network (for instance a WiFi network). But the invention is not limited to this type of network. Indeed it concerns any type of network comprising nodes (or network equipments) using a random access MAC protocol. So it may be also a fixed network.

Figure 1:
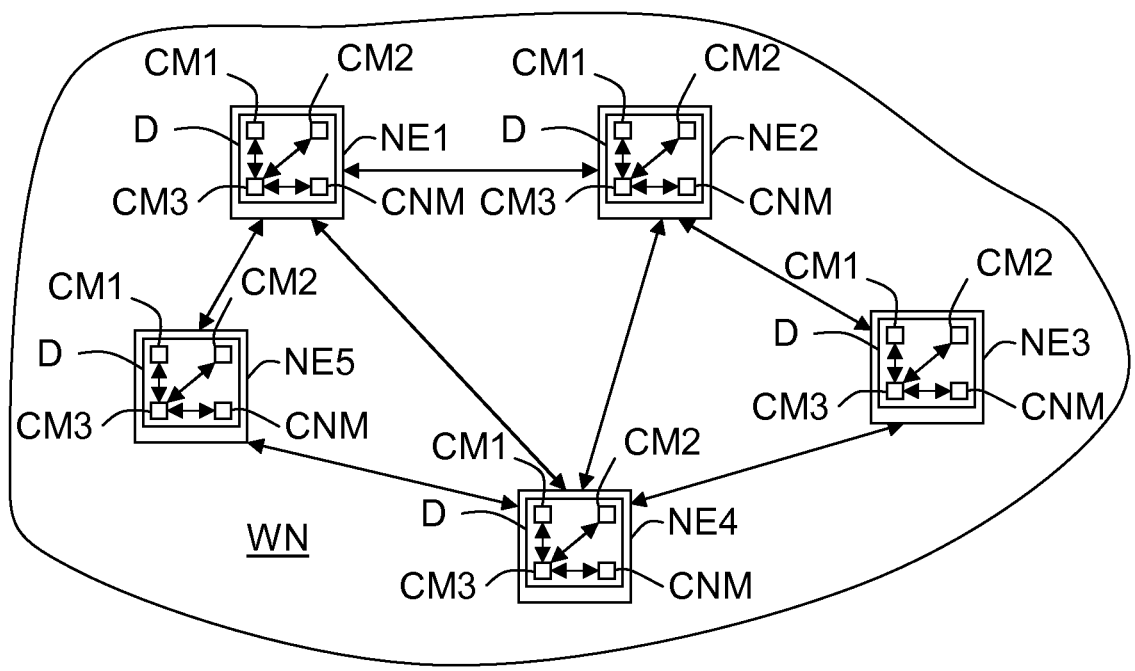
FIG. 1 schematically and functionally illustrates an example of network comprising five network equipments (or nodes) equipped with an example of embodiment of a device according to the invention, and FIG. 2 schematically illustrates an example of a feasible rates region.

Moreover, in the following description it will be considered that the wireless network (WN) is of the multi-hop type. So, and as illustrated in FIG. 1, it comprises wireless routers or access points NEi connected (or linked) therebetween and defining nodes. But the invention is not limited to this type of wireless network. Indeed it concerns also wireless network of the single-hop type, i.e. comprising base stations (or any equivalent radio network equipments) serving user (or client) wireless communication equipments and defining nodes. It is recalled that a single-hop type wireless network is a particular case of a multi-hop type wireless network.

In the illustrated example the node index i varies from 1 to 5, but the number of nodes NEi may be greater or smaller than 5.

As mentioned before, the invention proposes a method intended for computing online a feasible rates region in a network WN.

One means here by "feasible rates region" the set of all rates that can be simultaneously sustained by the network (WN) at a given time.

It is recalled that the 802.11 MAC protocol can be viewed as a function f that maps link input rates x (representing load) to link output rates y (representing throughputs) over a time period T: $y = f^{(T)}(x)$. When x is unconstrained and nodes NEi are allowed to transmit at the nominal radio bandwidth, the output rate of each link is generally less than its input rate due to interference and poor channel conditions. These two causes manifest themselves either as MAC backoffs and retransmission delays or as network layer packet losses resulting from buffer overflows, MAC collisions or poor wireless channel conditions.

Based on the above, a formal definition of the feasible rates region is: the set of all output rate vectors $y=(y_1, \ldots, y_l, \ldots, y_L)$ that result from constrained input rate vectors $x=(x_1, \ldots, x_l, \ldots, x_L)$ that are scaled down only by the inherent link packet loss rates vector $p=(p_1, \ldots, p_l, \ldots, p_L)$ as follows: $y_l=(1-p_l)x_l$ for each link $l=1, \ldots, L$ the packet loss rates $p=(p_1, \ldots, p_l, \ldots, p_L)$ are measured similarly to the maximum output rate (or capacity), when the links transmit alone at maximum input rate (or in backlogged mode). In the special cases where the inherent packet loss rates $p_l$ are zero, the feasible rates region is the set of all output rates that are equal to their corresponding input rates.

It should also be noted that the definition of feasible rates region can also be extended to rate vectors $y=(y_1, \ldots, y_l, \ldots, y_S)$ of S multi-hop flows with fixed routes instead of rate vectors $y=(y_1, \ldots, y_l, \ldots, y_L)$ of L links in a similar manner as above. The only difference is that the inherent packet losses for links are replaced by inherent packet losses $p=(p_1, \ldots, p_l, \ldots, p_S)$ for the multi-hop routes of these flows. The loss rate $p_s$ of each route s can be estimated based on the measured channel loss rates $p_l$ of the links in the route s, for instance by means of the relation $p_s=1-\Pi_{l \in s}(1-p_l)$.

The method, according to the invention, can be implemented at least partly by at least one device D according to the invention.

As it is schematically illustrated in FIG. 1, a device D, according to the invention, may be located into several (and preferably each) network equipment NEi defining a node of the network WN. But this device D could be also a network equipment or element coupled to a network node NEi, or a network equipment connected to the network WN, such as a management equipment.

So, a device D can be made of software modules, at least partly, or of electronic circuit(s) or hardware modules, or else of a combination of hardware and software modules (in this case the device D comprises also a software interface allowing interworking between the hardware and software modules).

When devices D are distributed into the nodes NEi, each of them determines a feasible rates region for its node NEi. When there is only one device D for the whole network or for a part of a network, this centralized device determines feasible rates region for all the network nodes NEi or for the nodes belonging to its network part.

The method according to the invention comprises two main steps which aim at determining primary and secondary extreme points defining a boundary of a feasible rates region.

This feasible rates region can be modeled by a convex polytope. The feasible rates region is characterized by K extreme points $c[k]=(c_{k1}, \ldots, c_{kL})$, where $k=1$ to K and where l represents a link between two nodes NEi (with $l=1$ to L). Any set of output rates $y=(y_1, \ldots, y_L)$ that lies inside the polytope, including the convex hull (or boundary), is feasible.

According to the invention and as detailed below, each point $c=(c_1, \ldots, c_L)$ in the convex hull (or boundary) of this polytope can be determined as a linear combination of the K extreme points $c[k]$ defining the polytope boundary (or boundary of the network feasible rates region). So each (non extreme) point $c=(c_1, \ldots, c_L)$ can be expressed by the relation $$c = \sum_{k=1}^{K} \alpha_k c[k],$$

with $$\sum_{k=1}^{K} \alpha_k = 1$$

and $\alpha_k \geq 0$.

Figure 2:
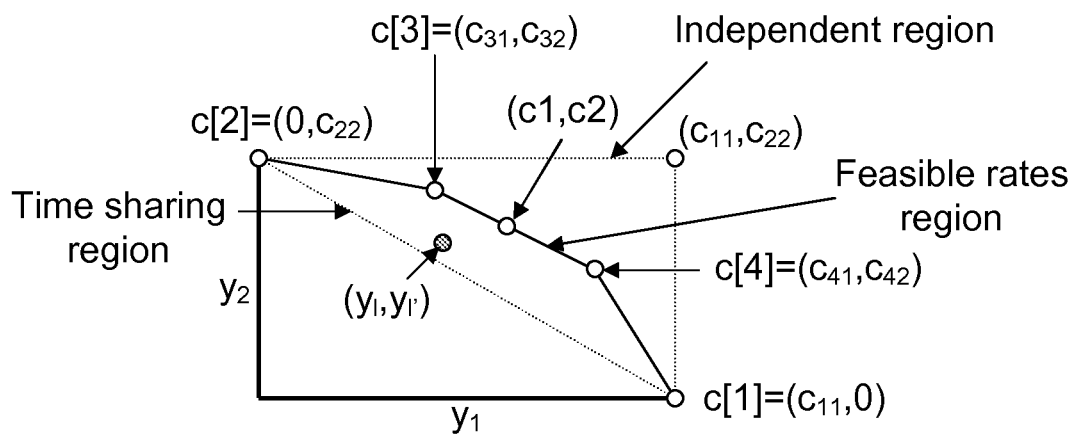

A very simple and non limiting example of a feasible rates region is illustrated in FIG. 2. In this example the number of links L is equal to 2 and the number of extreme points K defining the boundary of the feasible rates region is equal to 4. In this example, $c[1]=(c_{11}, 0)$, $c[2]=(0, c_{22})$, $c[3]=(C_{31}, c_{32})$ and $c[4]=(c_{41}, c_{42})$ are the four extreme points defining the boundary of the feasible rates region, which is included into a rectangle region (called "independent region"), the non extreme point $c=(c1, c2)$ belonging to the boundary is a linear combination of the K extreme points, and the "time sharing region" is a part of the feasible rates region where the links interfere but are scheduled in a mutually exclusive manner and therefore the sum of normalized output rates does not exceed unity ($y_1/c_1+y_2/c_2 \leq 1$). According to the invention, any output rate $y=(y_1, y_r)$ that lies in the polytope defined by the K extreme points is feasible.

It is important to note that TDMA networks or time-sharing CDMA networks can be characterized by convex feasible rates regions where the extreme points are readily provided by SINR formulas. However, it is not evident how such a model can be applied to networks using random access MAC protocol, like 802.11. In contrast to TDMA and CDMA networks, in random access networks, the feasible rates region is not necessarily convex and it is not given by analytical formulas. The method according to the invention uses a convex approximation to enable online computation. In addition, applying this model to a real-world random access network (802.11 in this example) requires addressing two challenges: (i) define the extreme points for adequate characterization of the feasible rates region, and (ii) compute these extreme points during network operation, in a non-intrusive manner.

The first main step (i) of the method consists in determining, for each link l established between two network nodes NEi, a primary extreme point which corresponds to a maximum output rate when the considered link transmits alone at a maximum input rate (or in a backlogged mode).

This first main step (i) can be implemented by a first computation means CM1 of a device D. As mentioned before, it can be implemented in a distributed manner, i.e. in each distributed device D associated to a node NEi, or in a centralized manner, i.e. in a single centralized device D of the network WN.

The second main step (ii) of the method consists in determining secondary extreme points by combining these primary extreme points with a chosen interference model.

This second main step (i) can be implemented by a second computation means CM2 of a device D. As mentioned before, it can be implemented in a distributed manner, i.e. in each distributed device D associated to a node NEi, or in a centralized manner, i.e. in a single centralized device D of the network WN.

The determined primary and secondary extreme points define together the boundary of the network feasible rates region.

In the non limiting example of feasible rates region illustrated in FIG. 2, $c[1]=(c_{11}, 0)$ and $c[2]=(0, c_{22})$ are two primary extreme points corresponding to the (two) maximum output rates (or capacities) when each link transmits alone, while $c[3]=(c_{31}, c_{32})$ and $c[4]=(c_{41}, c_{42})$ are two secondary extreme points which capture partial interference when the two links l transmit simultaneously.

Preferably, these primary and secondary extreme points are determined (or computed) online, i.e. during network operation, and in a non-intrusive manner.

Also preferably, each primary extreme point of a link l corresponds to a maximum output rate (or capacity) which is achieved when this link l transmits alone in a backlogged mode (i.e. transmits at a maximum input rate).

While this last definition of the primary extreme points is simple, their online determination is challenging, since during network operations links l do not transmit alone or in backlogged mode. So, it is possible to introduce an online capacity estimation procedure to compute the maximum output rates (or capacities).

Since wireless link quality and interference patterns vary over time, this online capacity estimation procedure comprises preferably a measurement phase. For instance, this online capacity estimation procedure may consist in using a capacity representation which relates the maximum output rate (or link maximum throughput or capacity) to the packet loss rate which is experienced by the MAC protocol.

The packet loss rate can be measured online using network-layer broadcast probes which incur low overhead. However, when interference is present this packet loss rate includes losses due to both channel errors and collisions. So, it is preferable to use a capacity representation that relates the maximum output rate (or maximum throughput or capacity) of a link to the channel loss rate of this link. In this case, one may measure online (link) packet loss rate that is experienced by the MAC protocol by means of network-layer broadcast probes, then one may use a channel loss rate estimator to filter out the collisions that are induced by cross-traffic into the measured packet loss rate in order to produce a channel loss rate, and finally one may use the capacity representation that relates the maximum output rate to the channel loss rate in order to determine this maximum throughput of the considered link.

It is important to note that it is preferable to determine a maximum output rate (or maximum throughput or capacity) which is a maximum User Datagram Protocol (UDP) throughput, because this provides higher accuracy. In a variant one may use a maximum TCP throughput, for instance, but this induces less accurate estimation of the feasible rates region.

For instance, one may use the following formula (1) to express the relation between the maximum UDP throughput T and the channel loss rate $p_l$ of a link l:

$$T = \frac{P}{t_{idle} + t_{tx}}, \quad (1)$$

where P is the UDP payload size, and $t_{idle}$ and $t_{tx}$ are the average idle time and transmission time, respectively, approximated as follows:

$$t_{tx} = \frac{P + H}{(1 - p_l^{ETX})T_{nom}},$$

where H is the UDP header size, $T_{nom}$ is the nominal throughput, ETX equals $1/(1-p_l)$ and is the expected number of MAC retransmissions assuming independent losses with probability $p_l$, $$t_{idle} = \begin{cases} F(1, [ETX] - 1) & \text{if } ETX < m \\ \left(F(1, m-1) + \sigma \frac{([ETX] - m)(W_m - 1)}{2}\right) & \text{otherwise,} \end{cases}$$

where $\sigma$ is the 802.11 slot duration, $W_0$ and $W_m$ are the minimum and maximum contention window size, respectively, m is the 802.11 backoff stage where the contention window size becomes maximum and equals $W_m$. Parameter m is an integer which is defined by the 802.11 standard. In addition, $$F(a, b) = \sigma \sum_{i=a}^{b} \frac{2^i W_0 - 1}{2}$$

is a function that expresses the total average backoff time between any two 802.11 backoff stages a and b, where a≤b.

In formula (1), all quantities are either known in advance or depend on $p_l$. $T_{nom}$ can be computed given 802.11 MAC parameters, data packet size and data rate, as described in the document of J. Jun et al. "Theoretical Maximum Throughput of IEEE 802.11 and its Applications", Proc. International Symposium on Network Computing and Applications (NCA), Cambridge, Mass., USA, April 2003. $W_0$, $W_m$ and m are given by the 802.11 specification. The header H and the packet payload P are also known, and ETX depends on $p_l$.

As mentioned above, the packet loss rate $p_l$ can be measured by a probing system that uses network layer broadcast probe packets. Broadcast packets are not subject to MAC retransmissions and reflect the packet loss rate experienced by the MAC protocol. For instance, the packet loss rate $p_l$ can be computed as $[1-(1-p_{DATA})(1-p_{ACK})]$, where $p_{DATA}$ and $p_{ACK}$ are DATA and ACK ("acknowledge") packet loss rates, respectively. These packet loss rates can be measured as fraction of lost DATA and ACK broadcast probes over a probing window. The broadcast probes emulating DATA and ACK can be sent at the data rate and packet size of the DATA and ACK packets, respectively.

During network operations, packet losses are due to both channel errors and collisions and the measured loss rates $p_{DATA}$ and $p_{ACK}$ will be higher than if the links were transmitting alone. In order to use the maximum UDP throughput representation, one must be able to distinguish collisions from channel errors and use formula (1) with a $p_l$ computed from the estimated channel loss rates of $p_{DATA}$ and $p_{ACK}$. Therefore, the problem of online maximum UDP throughput estimation translates to the problem of separating channel losses from collisions. Solutions to this problem have been designed for client-AP WLAN traffic scenarios or require low-level access to firmware. These solutions are notably described in the document of S. Rayanchu et al., "Diagnosing Wireless Packet Losses in 802.11: Separating Collision from Weak Signal", Proc. IEEE INFOCOM, Phoenix, Ariz., USA, April 2008, and in the document of K. Whitehouse et al., "Exploiting the capture effect for collision detection and recovery", EmNetS-II, 2005.

One may use any technique known from the man skilled in the art for estimating the maximum UDP throughput. Ad Hoc Probe is such a technique (which is notably described in the document of L.-J. Chen et al., "Ad hoc probe: path capacity probing in wireless ad hoc networks", Proc. International Conference on Wireless Internet (WICON), Budapest, Hungary, July 2005). However, Ad Hoc Probe is not appropriate for estimating the link maximum UDP throughput because a) in absence of interference it estimates a higher value closer to the nominal throughput (because ad-hoc probe estimations are based on minimum dispersion (delay) estimates which do not take into account the inherent link channel losses), and b) in the presence of interference the minimum delay filter will filter out congestion but again will not account for losses.

As mentioned above, during the second main step (ii) one determines the secondary extreme points by combining the primary extreme points (determined during the first main step (i)) with a chosen interference model.

For instance, this interference model may rely on two simplifying assumptions. Firstly, it may assume pair-wise interference, where each interference between two links of a pair is assumed to be independent from interferences between other pairs of links. Secondly, it may assume binary interference, where two links of a pair either interfere in a mutually exclusive manner or do not interfere. If we refer to the example illustrated in FIG. 1 (simple two-dimensional case), the interference model captures either the time sharing region or the independent region.

For instance the chosen interference model may be a binary LIR (Link Interference Ratio) interference model. It is recalled that the Link Interference Ratio (LIR) is a metric that measures interference between link pairs in CSMA networks, as described in the document of J. Padhye et al., "Estimation of Link Interference in Static Multi-hop Wireless Networks", Proc. ACM Internet Measurement Conference (IMC), Berkeley, Calif., USA, October 2005.

LIR is defined as $$LIR = \frac{c_{31} + c_{32}}{c_{11} + c_{22}},$$

where $c_{11}$, $c_{22}$, $c_{31}$ and $c_{32}$ are UDP throughputs when the links transmit backlogged individually and simultaneously, respectively. LIR=1 indicates that the links do not interfere. A lower LIR indicates a higher degree of interference.

For instance one may use a binary interference model based on a LIR threshold $LIR_{th}$. If the LIR of two links is greater than the LIR threshold $LIR_{th}$, the two links are considered as "non-interfering" and their feasible rates region is captured by the independent region defined by their primary extreme points ($c_{11, 0}$ $_{and\ (0,\ c22)}$) and their secondary extreme point ($C_{11}$, $c_{22}$). Otherwise, the two links are considered as "interfering" and their feasible rates region is the time sharing region defined by only the primary extreme points ($c_{11,\ 0)\ and\ (0,\ c22)}$).

Other binary interference models can be used, and notably a two-hop pair-wise binary interference model, where each link interferes with all links adjacent to its node endpoints and all the links adjacent to their one-hop neighbors. This other interference model (notably described in the document of S. Rangwala et al., "Understanding congestion control in multi-hop wireless mesh networks", Proc. ACM MobiCom, San Francisco, Calif., USA, September 2008) is easier to use online (i.e. during network operation) than the LIR interference model. Extensive experiments and measurements in a wireless mesh testbed have shown that it provides an adequate approximation to the binary LIR interference model with LIR threshold $LIR_{th}$=0.95. However, one may also use other variations of this hop-based interference model to realize a pair-wise binary interference model.

One may built a conflict graph of the network WN in which each vertex corresponds to a unidirectional link l and each edge between a pair of vertices corresponds to an interference between the pair of unidirectional links l which correspond to this pair of vertices, and one may determine the secondary extreme points from maximal independent sets of vertices of this conflict graph.

It is important to note that the pair-wise binary interference model determines whether an edge exists or not between two vertices of the conflict graph. If the corresponding links interfere based on this model, one adds an edge between the vertices. Different pair-wise binary interference models will in general generate different conflict graphs for the same network.

The independent sets of vertices of the conflict graph indicate sets of links l that can transmit simultaneously without interference. These independent sets can be computed using an independent set enumeration algorithm on the conflict graph. Alternatively, they can be computed using a clique enumeration algorithm in the complement of the conflict graph (in general, a graph G'=(V,E') with vertex set V and edge set E' is called the complement of a graph G=(V,E) with the same vertex set V and another edge set E, if the edge ($v_i,v_j$) is in E' if and only if it is not in E. In other words, two vertices $v_i$ and $v_j$ are adjacent in G' if and only if they are not adjacent in G. So cliques in the complement of the conflict graph are independent sets of the conflict graph).

It is important to note that one only uses here the maximal independent sets to reduce complexity of the enumeration algorithm. But a more accurate estimation would use all independent sets in the conflict graph.

An example of clique enumeration algorithm that can be used is described in the document of K. Makino et al., "New algorithms for enumerating all maximal cliques", Proc. 9th Scandinavian Workshop on Algorithm Theory, Humlebaek, Denmark, July 2004.

Each maximal independent set m ∈ M is represented by a 0-1 L×1 vector v[m] where the unit elements denote the links corresponding to the vertices of this independent set. Each vector v[m] can be mapped to a secondary extreme point $c^{(2)}[m]$ by replacing each unit entry with the corresponding capacity. This can be done using an L×L diagonal matrix $C^{(1)}$ where each column corresponds to a primary extreme point $c^{(1)}[k]$. Then, each secondary extreme point can be built as mentioned hereafter: $c^{(2)}[m]=C^{(1)}v[m]$, m=1, ..., M, where M is the number of maximal independent sets in the conflict graph.

As illustrated in FIG. 1, a device D may further comprise a third computation means CM3 coupled to its first CM1 and second CM2 computation means. This third computation means CM3 is arranged for computing a set of target output rates for the network WN from channel loss rates provided by the nodes NEi, neighbourhood relationships between nodes NEi, a routing matrix and the primary and secondary extreme points.

Routes (routing matrices), neighbourhood information (or relationships) and channel loss rate estimates can be disseminated into the network WN by means of a routing protocol, such as Srcr that comes with "Click". This information is used by each node NEi to update its Srcr topology database, to compute routes (for instance by using Dijkstra's routing algorithm using a link cost metric such as ETT, described in the document of R. Draves et al., "Routing in multi-radio, multi-hop wireless mesh networks", Proceedings of MobiCom, 2004), and to execute the optimization algorithm in the third control means CM3.

The set of target output rates can be computed locally (i.e. in a distributed manner) in each node NEi associated with a distributed device D, or in a centralized manner, i.e. in a single centralized device D of the network WN.

For instance, a set of target output rates $y=(y_1, \ldots, y_S)$ can be computed by optimizing a utility function $U(y_S)$ of the target output rates subject to constraints based on the routing matrix and the primary and secondary extreme points $c[k]=c_{k1}, \ldots, c_{kL}$).

An example of convex optimization of a utility function $U(y_S)$ is given below:

$$\text{Maximize} \sum_{s=1}^{S} U(y_s),$$

$$\text{subject to: } \sum_{s=1}^{S} R_{l,s} y_s \leq \sum_{k=1}^{K} \alpha_k c_{kl}, \text{ with } l = 1, \ldots, L$$

$$\sum_{k=1}^{K} \alpha_k, \text{ with } \alpha_k \geq 0, \text{ and } k = 1, \ldots, K,$$

and where S is the number of flows s, $R_{l,s}$ are binary routing variables indicating whether flow s is routed through link l (according to the routing matrix), and where the utility function is given by:

$$U(y_s) = \begin{cases} y_s^{1-\alpha}, & \text{if } \alpha \neq 1 \\ \log(y_s) & \text{otherwise,} \end{cases}$$

which is a well-known family that provides a wide range of objectives that trade-off fairness and throughput.

Then, given the network output rate vector $y=(y_1, \ldots, y_S)$, the third computation means CM3 selects the subset of rates $y_S$ for which an associated node NEi is a source, and it generates the corresponding optimized input rates $x_S$ corresponding to these output rates of the selected subset. For instance, each optimized input rate $x_S$ is given by $x_S=y_S/(1-p_S)$, where $p_S$ is the path loss. This path loss $p_S$ can be estimated based on the channel loss rates $p_l$ in the path s, for instance by means of the relation $p_S=1-\Pi_{l \in S}(1-p_l)$.

As illustrated in FIG. 1, a device D may further comprise a control means CNM arranged for limiting the rate of the flows of its associated node NEi according to the optimized input rates $x_S$ which are generated by the third computation means CM3. For this purpose it (CNM) may use Click BandwidthShaper, for instance.

The time scale at which the rate control according to the invention is adjusted depends on the capacity estimation interval (determined by the probing window size and period) and the computation time that the first CM1, second CM2 and third CM3 computation means take.

The capacity estimation interval is constrained by the network layer probing system. Probing frequency should be low enough (for instance every 0.5 second) to keep the overhead low, but enough probes should be used to ensure sufficient accuracy. Stable channel loss rates and hence stable capacity estimates can be obtained within few minutes (typically between approximately 100 seconds and 800 seconds).

The computation time is the time which is necessary to the first CM1, second CM2 and third CM3 computation means to compute the extreme points of the feasible rates region and to solve the optimization problem.

The invention offers an online optimization-based network layer rate control for mesh networks at a time scale of a few minutes, which allows eliminate a number of common performance problems occurring in such networks, e.g., avoid starvation and enforce fairness objectives without sacrificing much output rate (or throughput).

Moreover, the online computation of the feasible rates region can be also used for admission control (e.g. to determine whether a given set of rates can be sustained by the network at a given time) in addition to the described optimization method.

The invention is not limited to the embodiments of method, device and network equipment described above, only as examples, but it encompasses all alternative embodiments which may be considered by one skilled in the art within the scope of the claims hereafter.

The invention claimed is:

1. A method for computing a feasible rates region in a network using a random access MAC protocol and comprising nodes having links therebetween, during network operation, the feasible rates region being a set of rates that can be simultaneously sustained by the network, the method comprising:
    determining online, for each link, a primary extreme point corresponding to a maximum output rate when said link transmits alone at a maximum input rate, said determining a primary extreme point includes each primary extreme point of a link corresponding to a maximum output rate achieved when said link transmits alone at a maximum input rate;
    determining secondary extreme points by combining primary extreme points with an interference model, said primary and secondary extreme points defining a boundary of a feasible rates region;
    measuring by network-layer broadcast probes an online packet loss rate experienced by a MAC protocol;
    filtering out by a channel loss rate estimator collisions induced by cross-traffic into said measured packet loss rate to produce a channel loss rate; and
    providing a capacity representation relating said maximum output rate to said channel loss rate.

2. The method according to claim 1, wherein said maximum output rate is a maximum User Datagram Protocol output rate.

3. The method according to claim 1, wherein said determining secondary extreme points includes combining said primary extreme points with said interference model assuming a) pair-wise interferences, where each interference between two links of a pair is viewed as independent from interferences between other pairs of links, and b) binary interferences, where two links of a pair either interfere in a mutually exclusive manner or do not interfere.

4. The method according to claim 3, wherein said determining secondary extreme points includes building a conflict graph of said network in which each vertex corresponds to a unidirectional link and each edge between a pair of vertices corresponds to an interference between the pair of unidirectional links which correspond to said pair of vertices, and determining said secondary extreme points from maximal independent sets of vertices of said conflict graph.

5. The method according to claim 4, wherein each maximal independent set of vertices is determined by either an independent set enumeration algorithm on said conflict graph or a maximal clique enumeration algorithm on a complement of said conflict graph.

6. The method according to claim 3, wherein said interference model is a binary Link Interference Ratio interference model.

7. A device for computing a feasible rates region in a network using a random access MAC protocol and comprising nodes having links therebetween, during network operation, the feasible rates region being a set of rates that can be simultaneously sustained by the network, the device comprising:
- a first computation means arranged for determining online, for each link, a primary extreme point corresponding to a maximum output rate when said link transmits alone at a maximum input rate;
- a second computation means arranged for determining secondary extreme points by combining primary extreme points with an interference model, said primary and secondary extreme points defining a boundary of a feasible rates region; and
- a third computation means arranged for computing a set of target output rates for said network from channel loss rates provided by said nodes, neighbourhood relationships between nodes, a routing matrix and said primary and secondary extreme points,
- wherein said third computation means is arranged for computing said set of target output rates by optimizing a utility function of said target output rates subject to constraints based on said routing matrix and said primary and secondary extreme points, selecting a subset of output rates, for which an associated node is a source, from said computed set, and for generating optimized input rates corresponding to said output rates of the selected subset of output rates.

8. The device according to claim 7, wherein the device is configured to receive an online packet loss rate experienced by a MAC protocol, filter out collisions induced by cross-traffic into said measured packet loss rate to produce a channel loss rate, and provide a capacity representation relating said maximum output rate to said channel loss rate.

9. The device according to claim 7, further comprising a control means arranged for limiting the rate of the flows of said associated node according to said generated optimized input rates.

10. A device for computing a feasible rates region in a network using a random access MAC protocol and comprising nodes having links therebetween, during network operation, the feasible rates region being a set of rates that can be simultaneously sustained by the network, the device comprising:
- a processing circuit coupled with a memory, the processing circuit configured to:
  - determine online, for each link, a primary extreme point corresponding to a maximum output rate when the link transmits alone at a maximum input rate,
  - determine secondary extreme points by combining primary extreme points with an interference model, the primary and secondary extreme points defining a boundary of a feasible rates region, and
  - compute a set of target output rates for: said network from channel loss rates provided by the nodes, neighborhood relationships between nodes, a routing matrix, and the primary and secondary extreme points,
- wherein the set of target output rates is computed by: optimizing a utility function of the target output rates subject to constraints based on the routing matrix and the primary and secondary extreme points, selecting a subset of output rates, for which an associated node is a source, from the computed set, and generating optimized input rates corresponding to said output rates of the selected subset of output rates.

11. The device according to claim 10, wherein the processing circuit is further configured to limit the rate of the flows of said associated node according to said generated optimized input rates.

12. The device according to claim 10, further comprising a network interface configured to receive an online packet loss rate experienced by a MAC protocol, and the processing circuit is further configured to filter out collisions induced by cross-traffic into said measured packet loss rate to produce a channel loss rate, and provide a capacity representation relating said maximum output rate to said channel loss rate.

13. The device according to claim 10, wherein said maximum output rate is a maximum User Datagram Protocol output rate.

14. The device according to claim 10, wherein said processing circuit is further configured to combine said primary extreme points with said interference model assuming a) pair-wise interferences, where each interference between two links of a pair is viewed as independent from interferences between other pairs of links, and b) binary interferences, where two links of a pair either interfere in a mutually exclusive manner or do not interfere.

15. The device according to claim 14, wherein the processing circuit is further configured to build a conflict graph of the network in which each vertex corresponds to a unidirectional link and each edge between a pair of vertices corresponds to an interference between the pair of unidirectional links which correspond to the pair of vertices, and determine the secondary extreme points from maximal independent sets of vertices of said conflict graph.

16. The method according to claim 15, wherein each maximal independent set of vertices is determined by either an independent set enumeration algorithm on said conflict graph or a maximal clique enumeration algorithm on a complement of said conflict graph.

* * * * *